United States Patent [19]

Yapp et al.

[11] Patent Number: 4,492,080
[45] Date of Patent: Jan. 8, 1985

[54] TRACTOR HYDRAULIC CONTROL SYSTEMS

[75] Inventors: Robert E. Yapp, Solihull; John D. Smith, Sutton Coldfield, both of England

[73] Assignee: Massey-Ferguson Services N.V., Curacao, Netherlands Antilles

[21] Appl. No.: 590,675

[22] Filed: Feb. 21, 1984

Related U.S. Application Data

[63] Continuation of Ser. No. 299,603, filed as PCI GB 80/00075, Apr. 30, 1980, published as WO 80/02355, Nov. 13, 1980, § 102(e) date, Jan. 9, 1981 abandoned.

[30] Foreign Application Priority Data

May 9, 1979 [GB] United Kingdom ............ 7915993

[51] Int. Cl.³ .............................................. F15B 9/08
[52] U.S. Cl. ........................................ 60/388; 60/427; 60/468; 60/462; 60/494; 91/536; 91/445; 91/426
[58] Field of Search ............... 60/391, 392, 422, 427, 60/433, 446, 445, 468, 388, 462, 463, 494; 91/532, 536, 445, 426, 425; 137/596

[56] References Cited

U.S. PATENT DOCUMENTS

| | | | |
|---|---|---|---|
| 2,316,926 | 4/1943 | Willett | 60/427 |
| 2,600,702 | 6/1952 | Stephens | 91/445 |
| 2,888,805 | 6/1959 | Czarnocki | 60/388 |
| 3,048,981 | 8/1962 | Mark et al. | 60/462 |
| 3,534,774 | 10/1970 | Tennis | 136/596 |
| 3,538,949 | 11/1970 | Kramer | 137/596 |
| 3,579,986 | 5/1971 | Matsudo-Shi et al. | 60/427 |
| 4,256,142 | 3/1981 | Hancock | 91/532 |

FOREIGN PATENT DOCUMENTS

| | | |
|---|---|---|
| 741804 | 12/1955 | United Kingdom . |
| 747488 | 4/1956 | United Kingdom . |
| 813204 | 5/1959 | United Kingdom . |
| 839689 | 6/1960 | United Kingdom . |
| 839689 | 9/1961 | United Kingdom . |
| 990371 | 4/1965 | United Kingdom . |
| 1075449 | 7/1967 | United Kingdom . |
| 1097576 | 11/1968 | United Kingdom . |
| 1101775 | 11/1968 | United Kingdom . |
| 1239281 | 7/1971 | United Kingdom . |
| 309692 | of 0000 | Sweden . |

OTHER PUBLICATIONS

Extract from Valmet Salesmans Manual, 1964.

*Primary Examiner*—Robert E. Garrett
*Assistant Examiner*—Richard S. Meyer
*Attorney, Agent, or Firm*—John C. Thompson

[57] ABSTRACT

A tractor hydraulic control system of the kind comprising a power lift with a hydraulic actuator (12) and a main control valve (17) controlling the supply of fluid from a pump (19) to the actuator, the system including selector valve means (50) interconnected with the main control valve (17) and movable between a first position in which flow to and from the actuator (12) occurs via the selector valve means under the control of the main control valve and the associated system control mechanism (28) and a second position in which the actuator is hydraulically locked in a given position and an external services outlet (51) is placed in communication with the pump. Linkage means (60,61,62) operatively connects the selector valve means (50) and the system control mechanism (28) to condition the main control valve (17) to cause the pump (19) to supply fluid to the external service outlet (51) via the selector valve means on movement of the selector valve means to the second position. Preferably, the main control valve (17) is biased towards a position in which the pump delivery its maximum output flow to the selector valve means and movement of the selector valve means to its second position is arranged to disconnect the control mechanism from the main control valve.

7 Claims, 1 Drawing Figure

U.S. Patent    Jan. 8, 1985    4,492,080
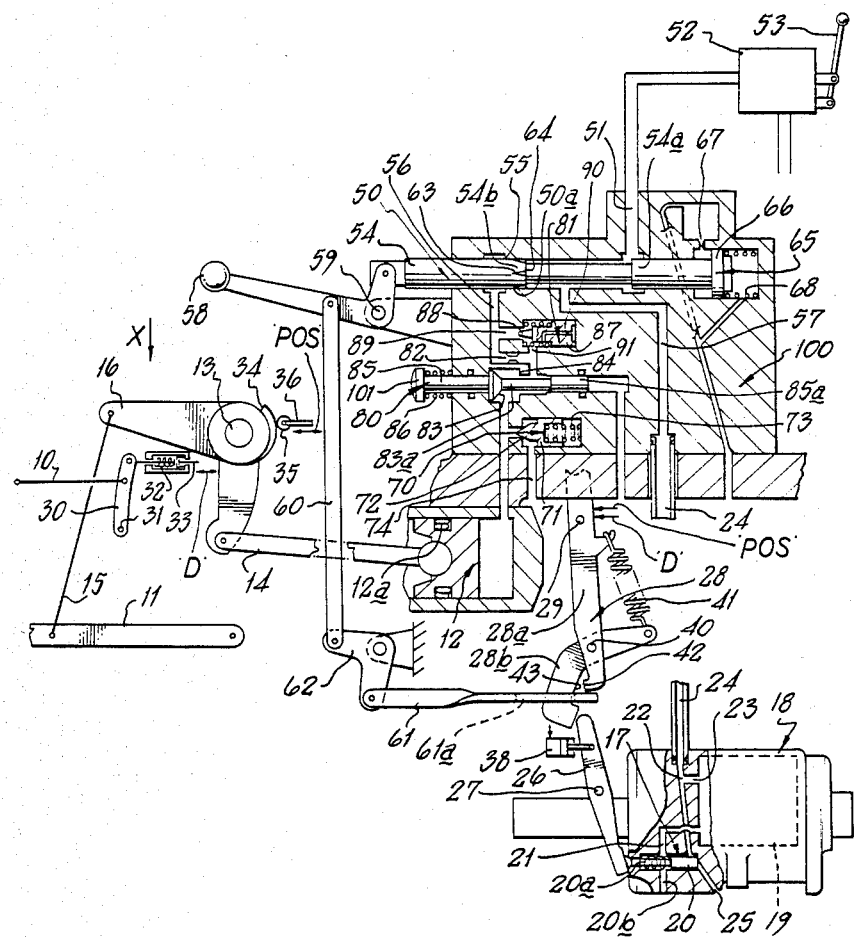

TRACTOR HYDRAULIC CONTROL SYSTEMS

This application is a continuation of Ser. No. 229,603 filed as PCT GB 80/00075, on April 30, 1980, publish as WO 80/02355, on Nov. 13, 1980, §102 (e) date Jan. 8, 1981, now abandoned.

TECHNICAL FIELD

This invention relates to tractor hydraulic control systems of the kind, hereinafter referred to as the kind specified, comprising a power lift having a hydraulic actuator for raising and lowering an implement hitch; manually operable system control means; a fluid pump; a main control valve means movable into a position for supplying fluid to the actuator from the pump, a position for discharging fluid from the actuator, and a neutral position in which fluid is neither supplied to nor discharged from the actuator, and a system control mechanism operatively connecting the implement hitch, the main control valve means and the system control means. One example of a tractor hydraulic control of the kind specified is shown in U.K. Patent Specification No. 1101775.

DISCLOSURE OF THE INVENTION

It is an object of the present invention to provide an improved form of tractor hydraulic control system of the kind specified which provides the facility to operate an external service from the pump.

According to the present invention there is provided a tractor hydraulic control system of the kind specified including selector valve means interconnected with the main control valve and movable between a first position in which flow to and from the actuator occurs via the selector valve means under the control of the main control valve means and the associated system control mechanism and a second position in which the actuator is hydraulically locked in a given position and an external services outlet is placed in communication with the pump and linkage means operatively connecting the selector valve means and the system control mechanism to condition the main control valve to cause the pump to supply fluid to the external service outlet via the selector valve means on movement of the selector valve means to the second position.

Using a control system in accordance with the preceding paragraph it is thus possible for the tractor operator to supply fluid to the external service outlet by simply moving the selector valve to its second position. This movement of the selector valve not only connects the pump with the external service outlet but also locks the actuator in the position occupied when the selector valve means is moved to its second position.

Thus, for example, if the tractor operator is ploughing using the tractor hydraulic control system operating under "draft" control and he wishes to make some adjustment to his plough, which can be made by the operation of an external hydraulic cylinder mounted on the plough, the operator can move the selector valve means to its second position thus locking the plough relative to the tractor (temporarily placing the plough effectively in "position" control) and enabling the operator to operate the external cylinder under the control of a spool valve connected to the external service outlet. When the adjustment has been made the hydraulic system can be returned to "draft" control by moving the selector valve means to its first position. Experience has shown that it is practical to operate a plough on "position" control for short periods during adjustments of the above type.

In a preferred arrangement the main control valve means is biased towards a position in which the pump delivers its maximum output flow to the selector valve means, and movement of the selector valve means to its second position is arranged to disconnect the control mechanism from the main control valve means and thus allow the main control valve means to move under the action of its bias to said maximum pump output flow position.

Preferably the control mechanism includes a control link which is in two relatively movable portions which are biased into a rigid operative condition in which the two portions move together to transmit signals to the main control valve, one of said portions being movable relative to said other portion against said link bias to break the signal path of said feedback control mechanism in response to movement of the selector valve means to its second position.

Drop rate control means may be provided in the connection between the main control valve means and the actuator to control the rate of descent under gravity of any implement mounted on the hitch linkage, said drop rate control means comprising a first fixed aperture orifice and a second variable aperture orifice in parallel, the aperture of said second orifice being variable in response to the pressure generated in said actuator due to the weight of said implement so as to reduce the size of the second variable orifice at higher actuator pressures so that the first and second orifices together act to provide a substantially constant rate of descent under gravity for a wide range of implements.

Manually operable actuator locking valve means may be provided in the connection between the main control valve means and the actuator, said locking valve means comprising a housing including a hydraulically balanced and slidable spool having a valve member, a valve seat, and a manually operable actuating means extending from said housing and operatively connected with said spool to allow an operator to manually bring the valve member into contact with the valve seat to lock the actuator in a particular position, the valve member being arranged to be held in contact with the seat by differential pressure.

The invention also provides a kit of parts for converting a tractor hydraulic control system of the kind specified to a system including an external service outlet supply function, the kit being characterised by including a valve block incorporating a selector valve means connectable via a first passage with the main control valve and the pump and via a second passage with the actuator, the valve block also including an external service outlet port communicating with the selector valve means, the selector valve means being movable between a first position in which the first and second passages are connected with each other and the outlet port is closed-off so that the actuator is left under the control of the main control valve and a second position in which communication between the first and second ports is cut-off to lock the actuator in a given position and communication between the first port and the outlet is established to allow supply of fluid to the outlet, and linkage means for operatively connecting the selector valve means and the system control mechanism so that movement of the selector valve means to the second position conditions the main control valve to cause the pump to supply fluid to the external service outlet.

DESCRIPTION OF THE DRAWING

One embodiment of the present invention will now be described, by way of example only, with reference to the accompanying diagrammatic drawing which shows a tractor hydraulic control system embodying the present invention.

BEST MODE OF CARRYING OUT INVENTION.

Referring to the drawing, a tractor three point hitch comprises a top link 10 and a pair of draft links 11. As is conventional, the draft links are raised and lowered by a hydraulic actuator in the form of piston and cylinder assembly 12 which is arranged to rotate a cross shaft 13 via a rod 14 and thus raise the drop links 15 via two lift arms 16 provided on the ends of the cross shaft 13.

The supply of hydraulic fluid to and the exhaust of hydraulic fluid from the piston and cylinder assembly 12 is controlled by a main control valve 17 housed in a casing 18 which also includes a variable delivery hydraulic pump diagrammatically designated 19 in the accompanying drawing and driven in any convenient manner from the tractor's engine. The piston and cylinder assembly 12 is provided with a high quality so called "zero leak" seal 12a which reduces leakage between the piston and cylinder to such low levels as to be in effect zero.

As can be seen from the diagrammatic representation of the main control valve 17 and pump 19, the valve 17 includes a spool 20 which controls the flow through a pump intake passage 21 and a piston and cylinder assembly exhaust passage 22. The spool 20 is biased to the maximum flow condition shown in the accompanying drawing in which the pump intake passage 21 is unrestricted by the spool and the exhaust passage 22 is closed off. With the valve in this condition the pump 19 is free to draw fluid from a sump via passage 20b and to supply pressursied fluid to a stand pipe connection 24 via a passage 23. The stand pipe connection 24 is connected with the piston and cylinder assembly 12 via various other passageways, drillings and valves as will be described below.

When the spool 20 is moved to the left against the action of spring 20a the intake passage becomes restricted and thus the delivery of the pump is reduced. Sufficient movement of the spool 20 to the left completely cuts off the intake passage 21 thus making the pump ineffective to generate further fluid pressure despite its continued operation. The spool 20 is able to assume a "neutral" position in which both the intake passage 21 and exhaust passage 22 are closed so that the supply of pressure to and exhaust of pressure from the piston and cylinder assembly 12 is prevented by the main valve 17.

Further movement of the spool 20 to the left from the above neutral position results in the progressive opening of the exhaust passage 22 thus allowing fluid to be discharged from the piston and cylinder assembly 12 via the stand pipe 24 and drilling 25 into the sump of the tractor. The pump is thus of the so-called inlet-controlled type.

The spool 20 is displaced between its supply neutral and discharge conditions by a lever 26 which is pivoted at 27 and acted on by a control linkage member 28 which is itself pivoted at 29 and is capable of receiving one or more signals from the three point linkage and the hydraulic supply circuit of the piston and cylinder assembly 12.

For the purpose of illustrating the present invention, it will be assumed that the hydraulic control system provides so called "pressure", "draft" and "position" control as described in, for example, the previously referred to U.K. Patent Specification No. 1101775. This is diagrammatically illustrated in the accompanying drawing in which the top link 10 is pivoted on an arm 30 which is itself pivoted on the rear of the tractor at 31, the arrangement being such that the compressive/tensile forces in the top link 10 result in pivoting of the arm 30 and consequent compression of spring 32 and displacement of a feed back signal element 33 to give a draft feed back signal 'D'. A position feed back signal designated 'POS' is provided by a cam 34 which rotates with the cross shaft 13 and engages roller 35, which is spring biased towards the cam 34, to displace a position feed back signal element 36 to give the signal 'POS'.

The two feed back signalling elements 33 and 36 will act on the control linkage member 28 as shown diagrammatically in the accompanying drawing. U.K. Pat. No. 1101755 describes in more detail actual practical feed back control linkages or mechanisms for the draft and position control functions. It will be appreciated that the lever 146 described in the above refferred to patent is equivalent to the linkage member 28 described in the present application.

The linkage member 28 which contacts lever 26 is in two portions 28a and 28b which are pivotally interconnected at 40 and are biased by a spring 41 into a rigid and stable condition in which an abutment 42 on portion 28a contacts the surface 43 on portion 28b so that the two portions 28a and 28b move together as a single member to pivot the lever 26.

As will be understood by those skilled in the art when operating the hydraulic control system on, for example draft control, the tractor operator sets the required draft setting on a system control means, for example, the form of a hand lever and this setting is transmitted as an input signal to the linkage member 28 and thus results in the appropriate movement of the main control valve 17 to raise or lower the three point linkage as required to achieve the selected draft setting. The draft feed back linkage element 33 supplies a feed back signal to the linkage member 28 so that, in the known manner, the main control valve 17 is returned to its neutral condition when the selected draft setting has been obtained.

In a similar manner, the position control function also operates under the control of driver operated control lever with its respective feed back signalling element returning the main control valve to its neutral condition when the selected position has been achieved.

The pressure control function operates in a somewhat different manner under the control of a driver operated control lever which sets the system pressure level at which a pressure control valve (not shown) begins to open. When the pressure control valve opens pressure is fed to hydraulic actuator 38 which can act either directly on the lever 26 as shown or on the linkage member 28 to reduce the pump flow to hold the system pressure at the selected level. Again U.K. Patent Specification No. 1101755 describes the construction and operation of a practical pressure control function in more detail.

Since the construction of the driver operated control levers and their associated linkages forms no part of the present invention it will not be described further. The reader is directed to the previously referred to U.K. Pat. No. 1101755 if a further detailed description of a practical control lever and associated linkage arrangement is required.

It is a feature of the present invention that the hydraulic control system can operate in two modes. A first so called "internal" mode in which any one of the draft, position and pressure control functions can be selected and operated normally in the manner referred to above and a second "external" mode in which a selector valve 50 can be operated to hydraulically lock the piston and cylinder 12 in a particular position and connect the pump output with an external services outlet 51 which can be used to operate external service through, for example, spool valves 52 under the control of levers 52.

In the accompanying drawing the selector valve 50 is shown in the external position in which a sealing portion 54b of a spool 54 of the valve isolates the piston and cylinder assembly 12 from the stand pipe 24 by cooperation with a sealing formation in the form of portion 50a of the bore in which spool 54 is slidable thus closing off the annulus 55 and cutting off communication between drillings 56 and 57. With the selector valve 50 in this condition portion 54a of spool 54 connects external outlet 51 with the drilling 57 thus allowing the pump delivery to be supplied to the spool valves 52.

The selector valve 50 is arranged to be moved between its external and internal positions by a hand lever 58 which is pivotally mounted at 59. A linkage comprising two links 60 and 61 interconnected by a bell crank 62 interconnects the selector valve 50 and the control linkage member 28. The link member 61 is provided with a slot 61a through which the part 28b of the linkage member 28 extends. When the selector valve 50 is in its external condition the linkage 60, 61, 62 is arranged to pull on part 28b of the member 28 thus disengaging the abutment 42 from the surface 43 and drawing back the linkage member 28 out of contact with the lever 26. This so called "breaking" of the linkage member 28 described above enables the main control valve 17 to be displaced by the spring 20a so that the maximum possible flow is delivered by the pump to the external services (through the spool valves 52 in this case).

The selector valve 50 is moved to its internal condition by moving the hand lever 58 in the direction of the arrow X, this moves the valve spool to a new position in which the drillings 56 and 57 are placed in communication by the sealing portion 54b disengaging bore portion 50a thus opening the annulus 55. The external services outlet 51 is also closed off by the spool portion 54a. The part 28b of the linkage member 28 is also allowed to return to its rigid and stable condition under the action of spring 41 as link 61 is moved by hand lever 58, thus re-establishing the normal connection of the control linkage with the lever 26.

Axially extending passages in the form of cutouts 63 (or small axial bores) extend for part of the length of sealing portion 54b of the spool. These cut outs ensure that when the selector valve is moved from its external to its internal condition the opening of the annulus 55 is modulated by promoting a small flow through the annulus 55 as the end 64 of the sealing portion 54b approaches the annulus but before end 64 actually enters the annulus. The cutouts (or small axial bores) may be shaped, once in operation, to provide either a constant flow rate through the annulus as the end 64 approaches the annulus or a progressively increasing flow rate as the end 64 approaches the annulus.

The right hand end of the spool of the selector valve 50 is provided with a dash pot damping device 65 in the form of a piston 66 which is arranged, when the selector valve is being moved from its external to its internal condition, to force fluid through a restriction 67. This thus slows down the speed with which the spool valve can be changed from its external to its internal condition thus, in conjunction with the cut-outs 63 (or small axial bores) in the spool portion 54, reducing the likelihood of any undesirable effects occurring at the piston and cylinder assembly 12, due to the sudden release of fluid through annulus 55, when the hydraulic system again reverts to its internal operating mode.

The selector valve is biased towards its internal operating mode condition by a spring 68. The hand lever 58 is in fact associated with an over-centre device (not shown) which is capable of retaining the hand lever 58 in which ever operating condition is selected.

Thus far described, the hydraulic system offers the capability of providing the normal draft, position and pressure control functions when operating in its normal internal mode with the selector valve 50 moved to the left from the position shown in the accompanying drawing coupled with the ability to simultaneously hydraulically lock the piston and cylinder assembly 12 in a particular position and to supply full pump flow to an external service simply by moving the hand lever to the external position shown in the drawing.

Thus, it is possible for a tractor operator to be using the tractor on draft or position control and by, movement of the hand lever 58 to its external position, to provide the full flow of the pump 19 to some external service whilst locking the three point linkage in the position which it occupied when the external service was connected to the pump. For example, if the tractor operator is ploughing on draft control with a plough which is adjustable using a spool valve controlled hydraulic cylinder he can effect adjustment of the plough during actual ploughing by moving the hand lever 58 to the external position and operating the appropriate spool valve lever 53 in the manner necessary to make the desired adjustment. When adjustment is completed he can then return the hand lever 58 to its normal internal position.

As will be appreciated whilst the adjustment is being effected by the spool valve 52 the piston and cylinder assembly 12 is locked and hence the plough is in effect in position control. Such a condition can be tolerated for short periods of time without any really adverse effect on the plough occuring.

It will be appreciated that if the system is operating on pressure control when the valve 50 is moved to its external position, although the external services outlet 51 is still enabled to receive the pump flow, the maximum pressure level which the external service can receive is still governed by the pressure level which has been set by the tractor driver on the pressure control function control lever despite the breaking of linkage member 28.

The hydraulic system includes a cylinder relief valve 70 to protect the piston and cylinder assembly 12 against the generation of excessive pressure when for example, a heavy implement is being carried on the three point linkage across rough ground which tends to promote bounce of the implement and thus the possibility of the generation of high pressures in the piston and cylinder assembly 12. This is particularly important when the selector valve is in the external position thus isolating the actuator from the normal system relief valve on the pump. The relief valve 70 comprises a valve member 71 which is biased into contact with the valve seat 72 by a spring 73. When the valve opens fluid is spilled from the piston and cylinder assembly into the tractor sump via passage 74.

Although the hydraulic system will always include some form of cylinder relief valve it may optionally include a cylinder lock valve 80 which can be used as a further means of isolating the piston and cylinder assembly 12 from the remainder of the hydraulic system, and a drop rate control means in the form of a drop rate control valve 81 in parallel with a drop rate control orifice 82.

Dealing first with the cylinder lock valve 80, this comprises a tapering valve member 83 carried on a spool member 83a which is balanced by making the spool end portions 85 and 85a of the same diameter. The valve member 83 can be manually brought into contact with a valve seat 84 by depressing an actuating means in the form of a button 101 carried by end portion 85, which projects from valve block 100, against the action of a spring 86.

The leakage across valve seat 84 when engaged by the valve member 83 is designed to be nominally zero and, although a tapering poppet type of valve member is shown, any valving arrangement can be employed which is capable of achieving the required nominally zero leakage.

Thus if, for example, the tractor operator wished to lock the draft links 11 in the fully raised position during maintenance work on an attached implement this could be accomplished by depressing the button 101 to close the valve seat 84 and then shutting off the tractor engine so that the pressure on the pump side of the valve seat 84 decays below that in the piston and cylinder assembly 12 which is supporting the implement. With the lock valve in this condition the valve member 83 would be held in contact with the valve 84 by the differential pressure so that the tractor operator could then safely work on the implement without the risk of the draft links falling which could occur, over an extended period of time, if he was to rely solely on the selector valve 50 to maintain the pressure in the piston and cylinder assembly 12. As an added safety precaution it is contemplated that some form of mechanical holding means could be provided to hold the valve member 85 against the seat 84 eliminating the requirement to rely on differential pressure to do this. For example, the end portion 85 could be screw-threadedly received in the associated valve housing so that the end portion 85 would be screwed into the housing to bring the valve member 83 against the seat 84.

The use of a mechanical holding means would also ensure that should the system pressure exceed that in the piston and cylinder assembly the valve 83 would not lift and allow the draft links to rise inadvertently.

Additionally, it will be seen that if the spool 83 is in two parts so that the end portion 85 is simply arranged to push the valve member 83 against the seat and can be moved away from the valve member 83 without drawing back the valve member 83 with it, it would then be impossible for the valve seat 84 to be opened once closed other than by the pressure in the hydraulic system exceeding that in the piston and cylinder assembly and thus displacing the valve member 83 out of contact with the seat 84. This would ensure an extremely safe arrangement in which it would be impossible for the operator to deactivate the cylinder lock valve 80 and cause the draft links to suddenly drop.

The function of the parallel arrangement of the drop rate control valve 81 and orifice 82 is to ensure that the time taken for an implement mounted on the draft links to fall under gravity remains substantially constant, and at a level such as to make damage to the implement less likely, no matter what the weight of the implement.

Basically the drop rate control valve is a variable orifice which is arranged to provide a higher restriction to the exhausting of fluid from the piston and cylinder assembly 12 at higher system pressures. This variable orifice is defined between a tapering nose portion 88 of the valve member 87 and a co-operating opening 89. The pressure present in the piston and cylinder assembly 12 is communicated to the right hand end 89 of the valve member 87 by drilling 90 and, when fluid is discharged from the piston and cylinder assembly, the pressure drop across the fixed and variable orifices causes the valve member 87 of the variable orifice to move to increase the restriction to flow. This controls the discharge rate. By using a high rate spring 91 to oppose movement of the valve member 87 towards the opening 89 and by providing a damping effect on the movement of valve member 87 towards the opening 89 by sizing drilling 90 so as to control the rate of build-up of pressure at the right hand end of valve member 87 a progressive closing off of the variable orifice can be achieved at higher system pressures.

For example, when the three point linkage is carrying a heavy implement at close to its maximum weight carrying capacity the variable orifice provided by the drop rate control valve will be arranged to be completely closed off so that the drop rate of the implement is controlled solely by the fixed orifice 82. Typically the drop rate will be of the order of two feet per second. As will be appreciated, when the three point linkage is carrying a less heavy implement the pressure generated in the piston and cylinder assembly due to the weight of the implement will be lower and thus the variable orifice would have a larger opening for the discharge of fluid from the piston and cylinder assembly so that the lighter implement descends at approximately the same rate as the heavier implement referred to above.

The present invention as described above thus provides a tractor hydraulic control system which allows an external service such as a spool valve controlled hydraulic actuator to be brought into operation simply by the movement of hand lever 58 and the appropriate movement of spool valve control lever 53.

It will be appreciated that when operating with an external service controlled by some other lever such as the spool valve lever 52 the requirement for hand lever 58 can be dispensed with if spool valve lever 53 is connected with valve 50 and link 60 in such a manner that initial movement of the spool valve lever 53 is arranged to bring about the movement of the valve 50 and feedback link part 28b to the position shown in the drawing.

Since in such an arrangement the spool valve control lever 53 would take over the additional functions previously performed by the hand lever 58 this would further simplify the operation of an external service since this would now only involve the movement of one control lever namely the spool valve lever 53. This arrangement may, however, be less desirable than the two lever arrangement described for some applications since it would inevitably result in more resistance to the movement of the spool valve lever 53 which might become tiring for an operator required to make a large number of movements of the spool valve lever 53 for each movement of the hand lever 58.

Also, since the single valve block 100 contains the selector valve 50, dashpot 65, fixed orifice 82, drop rate control valve 81, cylinder lock valve 80 and cylinder relief valve 70 it is easy to modify an existing hydraulic system to include the above features simply by fitting a kit comprising valve block 100 and some form of linkage (e.g. 60, 61, 62) to operate on the control linkage member 28). Clearly if it is desired to only add certain of the features to an existing system appropriate valve blocks can be designed based on the block 100.

To illustrate the ease with which an existing hydraulic system can be modified the system shown in FIG. 6 of British Patent Specification No. 1101775 can be modified to include the present invention by removing the cast plate which receives the upper end of pipe 121 and bolting the valve block 100 of the present invention in place of the cast plate. Additionally some form of linkage corresponding to the linkage 60, 61, 62 of the present invention is caused to enter the side of the casing of the previously referred to patent specification via a removable cover which is already provided in the casing for some other purpose and is adapted or replaced by a modified cover.

It will be understood that although a mechanical linkage 60, 61, 62 is provided between the selector valve 50 and the control linkage member 28, the mechanical linkage 60, 61, 62 could be replaced by any form of linkage. (e.g. fluid pressure-operated or electrical) which is capable of producing the necessary effect on member 28.

Although in the arrangement described above the pump 19 is caused to deliver its maximum possible flow when the system is in its "external" modes by the breaking of the linkage member, this effect can be achieved without the use of a two part linkage member. For example, in the previously referred to British Patent Specification No. 1101775 springs 207, 245 bias the control linkage 146 into contact with valve control lever 140. Thus if the linkage 60, 61, 62 of the present invention was arranged to act on the linkage 146 of British Patent Specification No. 1101775 linkage 146 could be arranged to be drawn out of contact with lever 140 to give the maximum flow condition of the pump by simply compressing springs 207, 245.

Also, although hand lever 58 is shown acting directly on selector valve 50 it may be mounted at a location remote from the selector valve and would then be connected with the selector valve and the linkage 60, 61, 62 via some suitable means such as a cable or rod system.

We claim:

1. A tractor hydraulic control system comprising a power lift having:
   a hydraulic actuator for raising and lowering an implement hitch;
   a fluid pump;
   conduit means connecting the actuator and pump;
   a main control valve for controlling flow through the conduit means and having supply and discharge positions allowing the supply of fluid to and discharge of fluid from the actuator, and a neutral position in which fluid is neither supplied to nor discharged from the actuator; manually operable system control means for providing a power lift command signal to the main control valve; a system control mechanism operatively connecting the implement hitch, the main control valve and the system control means;
   a selector valve connected in the conduit means, the selector valve having an external services outlet and a valve member movable between a first position in which flow to and from the actuator occurs via the selector valve under the control of the main control valve and the associated system control mechanism, and a second position in which the actuator is hydraulically locked in a given position and the external services outlet is placed in communication with the pump via the conduit means;
   bias means to bias the main control valve towards a supply position in which the pump delivers its maximum output flow to the selector valve, and linkage means operatively connecting the selector valve and the system control mechanism to automatically disconnect the system control mechanism from the main control valve to allow the main control valve to move to said maximum pump output flow position under the action of the bias means on movement of the selector valve to its second position thereby ensuring the supply of fluid to the external services outlet.

2. A system according to claim 1 in which the control mechanism includes a control link which is in two relatively movable portions, link bias means being provided to bias said portions into a rigid operative condition in which said portions move together to form a signal path to the main control valve, one of said portions being connected with the linkage means and being movable relative to said other portion to break the signal path of said control mechanism in response to movement of the selector valve to its second position.

3. A system according to claim 1 in which a damping device is provided to control the speed at which the selector valve can be moved from its second position to its first position.

4. A system according to claim 1 in which the valve member of the selector valve means is a spool member which is axially movable within a valve body, the spool member having an axially extending sealing portion which co-operates with a sealing formation on the valve body over a range of axial movement of the spool member approaching its second position, the sealing portion and formation being arranged to co-operate to lock the actuator when the spool member is in its second position, and part of the axial length of the sealing portion including a number of axially extending passages which ensure partial flow across the sealing formation prior to disengagement between the sealing portion and formation, as the spool member moves from its second position towards its first position.

5. A system according to claim 1 in which a drop rate control means is provided in the conduit means to control the rate of descent under gravity of any implement mounted on the implement hitch, said drop rate control means comprising a first fixed aperture orifice and a second variable aperture orifice in parallel, the aperture of said second orifice being variable in response to the pressure generated in said actuator due to the weight of said implement so as to reduce the size of the second variable orifice at higher actuator pressures whereby the first and second orifices together act to provide a substantially constant rate of descent under gravity for a wide range of implements.

6. A system according to claim 5 in which the variable orifice is defined between a tapering nose portion of an orifice valve member and a co-operating opening, the pressure drop across the fixed and variable aperture orifices during discharge of fluid from the actuator being arranged to move the nose portion to increase the restriction provided by the variable aperture orifice against the action of high rate spring means.

7. A system according to claim 1 in which a manually operable actuator locking valve means is provided in the conduit means, said locking valve means comprising a housing including a hydraulically balanced and slidable spool having a valve member, a valve seat, and a manually operable acutating means extending from said housing, said actuating means being operatively connected with said spool to allow an operator to manually bring the valve member into contact with the valve seat to close-off the conduit whereby the actuator is locked in a particular position.

* * * * *